April 16, 1935.  C. J. HALBORG ET AL  1,997,862
METHOD OF DRESSING GRINDING WHEELS
Filed Dec. 9, 1932
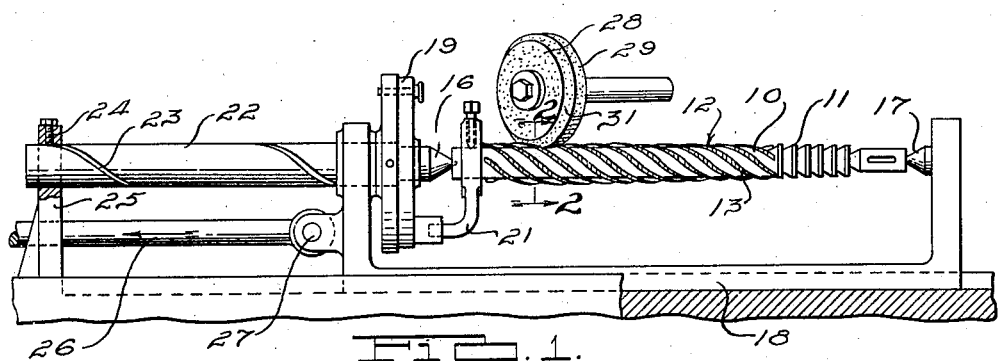
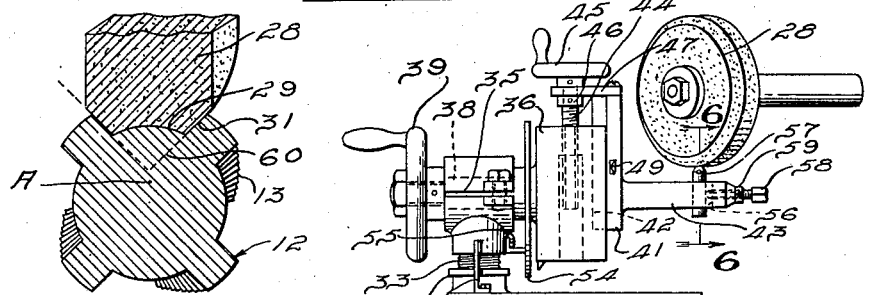
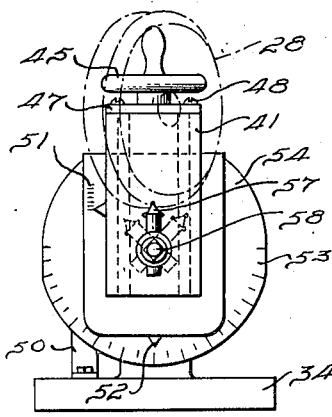
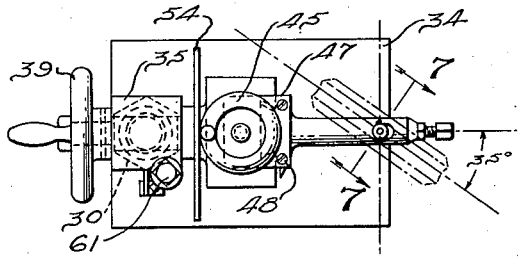
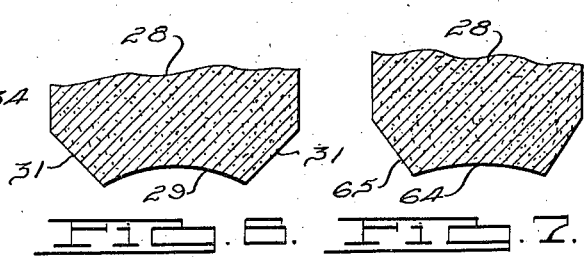
INVENTORS.
Carl J. Halborg,
William A. Hart,
Paul F. Seibold.
BY
Harness, Dickey, Pierce & Hann.
ATTORNEYS.

Patented Apr. 16, 1935

1,997,862

UNITED STATES PATENT OFFICE 1,997,862

METHOD OF DRESSING GRINDING WHEELS

Carl J. Halborg, William A. Hart, and Paul F. Seibold, Detroit, Mich., assignors to Colonial Broach Company, a corporation of Michigan Application December 9, 1932, Serial No. 646,540

5 Claims. (Cl. 125—11)

Our invention relates to grinding wheels and particularly to the method of dressing a grinding wheel for machining spline shafts and broaches of the spiral type wherein the rows of lands or teeth are disposed in helical paths about the axis of the shaft or broach.

Broaches of the spiral type have been made heretofore for coarse work and have been constructed on a milling or like machine with metal cutting tools. Such broaches were of the conventional type and were not employed for precision work. Through the practice of our present invention, we are able to grind the rows of teeth and the body of the broach to precise dimensions so that the broach may be employed for a finishing operation to accurately finish spiral splineways to predetermined dimensions. Through the success in perfecting dressing of a grinding wheel, spiral spline shafts, spiral splined broaches and spiral splineways may be accurately and rapidly produced and are now being employed in the automotive transmission art, where heretofore straight splines were always utilized.

Accordingly, the main objects of our invention are to provide a grinding wheel for machining spiral slots to produce lands or teeth disposed in spiral relation to the axis of the element and which are of precise size, form and space; to produce a spiral slot by a grinding operation by the method of rotating an element in accordance with its longitudinal movement relative to a grinding wheel which is offset angularly to the axis of the element an amount in accordance with the angular lead of the spiral slot to be machined; to provide a dressing fixture having a dressing element thereon which may be adjusted to project above a longitudinal, rotatable axis, a distance equal to the radius of the depth of the slot of the element, and may be disposed relative to the periphery of the wheel in coincidence with the line the axis of the element will coincide with, when being ground, which will thereby dress the periphery in an elliptical form, which will produce a true arc on the body of the element; to provide side dressing elements for the stone which may be moved across the side edges thereof in the plane in which the first dressing element was rotated to dress sides on the periphery edge of the wheel, which will produce parallel sides to the teeth of the broach when operating thereon; and in general, to provide a dressing device for a grinding stone which accurately machines the body and lands or teeth of spiral broaches to precise accurate dimensions, which is simple in operation and economical of manufacture.

Other objects and features of novelty in our invention will be either specifically pointed out or will become apparent, when referring for a better understanding of our invention, to the following description in conjunction with the accompanying drawing, wherein:

Figure 1 is a broken view, partially in elevation and partially in section, of a spiral broach producing mechanism which embodies features of our invention, Figure 2 is an enlarged sectional view of the structure illustrated in Figure 1, taken on the line 2—2 thereof, Figure 3 is a view of a dressing mechanism which may be employed in conjunction with the machine illustrated in Fig. 1 and which likewise embodies features of our invention, Figure 4 is an end view of the structure illustrated in Figure 3, Figure 5 is a plan view of the structure illustrated in Figure 3, Figure 6 is an enlarged sectional view of the structure illustrated in Figure 3, taken on the line 6—6 thereof, and Figure 7 is an enlarged sectional view of the structure illustrated in Figure 5, taken on the line 7—7 thereof.

Referring to Figure 1, we have illustrated a broach 10 having frontwardly disposed annular cutting edges 11 of progressive heights from the front end, which are utilized for machining a hole to true accurate dimension. Following the cutting edges 11, a plurality of rows 12 of teeth 13 of progressive heights, are illustrated disposed in like spiral rows relative to the axis of the broach. The broach is preferably milled in accordance with the lead of the spiral rows, in a milling machine before hardening and intersected by grooves disposed in planes at right angles to the axis of the broach to form the plurality of teeth of substantially exact and radially increasing dimensions. A slight amount of material is left on the side of the row of teeth and on the body of the broach to be machined by a grinding operation after hardening. The broach is then heat treated in a manner to reduce the warpage to a minimum by methods known in the art, such as normalizing before machining, suspending the broach in a vertical position in the furnace, and in accurately controlling the heating and quenching operation.

After the heat treating operation, the broach is mounted on a pair of centers 16 and 17 on a movable bed 18 and caused to rotate with an indexing head 19 by means of a dog 21, as clearly illustrated in the figure. The head 19 is mounted on a shaft 22 having a groove 23 in the form of a master thread having a lead the same as that of the rows of teeth. The groove is engaged by a projecting finger 24 of a stationary head 25 through which the shaft 22 moves when the table 18 is moved toward the left with reference to the finger. The movement is accomplished through a pull bar 26 which is connected to the table 18 by a pin connection 27. The movement causes the rotation of shaft 22 and therefore that of the broach 10 in accordance with the lead of the groove 23. A grinding wheel 28 has its peripheral edge 29 and its side edges 31 preformed in such manner as to machine the space between the rows of teeth to accurate dimensions as illustrated in Fig. 2. The wheel 28 may, when desired, be of the disc type to separately machine the base of the shaft and the sides of the teeth although the single wheel is preferred, its method of dressing will now be described in detail.

In Fig. 2, we have illustrated an enlarged section of the broach wherein it will be noted that the grinding wheel 28 is of such shape that its peripheral edge 29 and its side edges 31 have been dressed to form parallel sides to the teeth which are disposed equidistant from a plane through the center line of the broach and which machines the body portion of the broach to true circular dimension. It is clearly apparent that a curved form other than a circle must be dressed on the wheel 28 in order that when the wheel is set off at an angle to the axis of the broach it will dress a true arc on the body portion thereof. In a similar manner, the side edges of the wheel must be dressed with the offset angular relation of the wheel to the axis of the broach in mind.

For producing such a dressing, we have invented a dressing fixture as clearly illustrated in Figs. 3, 4 and 5. A bracket 33 having a base 34 and a bearing 35 is connected by a threaded shank and adjustable by a nut 30 to have the axis of the bearing accurately aligned with the centers 16 and 17 when the base 34 is disposed on the table 18 to be slidable thereon under the wheel during a dressing operation. A block 36 is provided with a trunnion 37 having a shaft 38 thereon which is supported in the bearing 35 and extends therebeyond to support a hand wheel 39 which is rigidly attached thereto. Through the rotation of the hand wheel 39 the block 36 is rotated about a line coincident with the axis of the shaft 38. A dovetailed slide 41 is mounted in a dovetailed slot 42 disposed in the block 36 of a depth to act as a stop to prevent a projecting arm 43 on the slide from moving below coincident with the axis of the shaft 38.

A lead screw 44 engages threads in the block 36 having a hand wheel 45 attached thereto in fixed relation and having a nut 46 disposed thereon in spaced relation to the hand wheel for receiving an arm 47 which is attached to the end of the slide 41 by screws 48. The slide 41 is provided with a pointer 49 adjacent to a scale 51 disposed on the face of the block 36. A similar pointer 52 is provided on the lower end of the block 36 adjacent to a circular scale 53 disposed in the face of a plate 54 which is secured to the bracket 33 by screws 55. An aperture 56 is provided in the arm 43 of the slide 41 in which a dressing tool 57 of a well known type is mounted for longitudinal adjustment and retained in fixed position by a set screw 58 and a lock nut 59.

When the peripheral surface 29 is to be dressed upon the wheel 28, the dressing fixture is mounted on the table 18 to have the axes of the shaft 38 and arm 43 coincident with each other and the line between the centers 16 and 17. The arm 43 of the slide 41 is moved into aligned position with the shaft 38 by the movement of the hand wheel 45, moving the slide to its lowermost position. The dressing tool 57 is then moved above the center of the arm 43 a distance equal to the radius of the body portion of the broach to be ground, after which the hand wheel 39 is oscillated to oscillate the tool 57 across the periphery of the wheel 28 which is, of course, set off in predetermined angular relation to the line between the centers 16 and 17 in accordance to the lead of the teeth on the spiral broach. After the peripheral edge 29 has thus been dressed, the block 36 is rotated to a position in accordance with the number of the teeth on the broach and moved upwardly in accordance with the thickness of the teeth to have the dressing element disposed on the line 60 as illustrated in Fig. 2 to be movable parallel to said line through the manipulation of the hand wheel 45. Before this movement and after the adjustment is made, a nut 61 is moved to clamped position to secure the shaft 38 against rotation by the hand wheel 39.

The center of the shaft 38 is moved toward the point A to bring the cutting edge of the tool 57 in the plane of the line 61 through the adjustment of the nut 30 on the base 34, after which the rotation of hand wheel 45 moves the dressing tool 57 along the stone to dress the edge 31 thereon. Thereafter it is only necessary to revolve the block 36 to a similar position on the opposite side of the vertical and operate the hand wheel 45 to have the dressing element 57 moved across the opposite side of the stone 28. In this manner, the sides 31 are dressed in accordance with the spacing of the sides of the teeth and the edge 29 is dressed to accurate length. A suitable scale 50 may be employed to obtain the vertical adjustment of the bracket 33.

In Fig. 6 the enlarged sectional view of the dressing wheel 28 clearly illustrates the arcuate form 29 dressed thereon angularly of the stone and which is a true arc conforming to the arc on the body portion of the broach which appears as at an ellipse 64 on a section of the stone at right angles to its plane of rotation. In a similar manner, the side edges 31 dressed on the wheel by the above described method, are of predetermined slope to conform to the slope of the sides of the teeth and also to the spacing thereof, which assumes a slope of different angle on the wheel in a plane normal to its plane of rotation, as illustrated at 65 in Fig. 7.

The spline shaft is mounted in extension of a master shaft having a lead of a slope conforming to that of the rows of teeth of a broach on the lands of the spline shaft, for rotating the shaft relative to its longitudinal movement and to a dressing wheel which is disposed at an angle to the shaft in accordance with the lead of the rows of teeth on the lands. An indexing head 19 is provided for rotating the shaft to have the various rows of teeth or lands positioned relative to the grinding element 28 in accordance with the single lead 23 of the shaft 22. In this manner, the spline broach is ground in practically as simple a manner as a broach with straight rows of teeth and to as accurate dimensions, making accurate and precise spline broaches commercially possible.

While we have described and illustrated but a single embodiment of our invention, it will be apparent to those skilled in the art that various changes, omissions, additions and substitutions may be made therein without departing from the spirit and scope of our invention, as set forth in the accompanying claims.

We claim as our invention:

1. The method of dressing a concave form on the peripheral surface of a grinding wheel which includes, rotating said wheel, and oscillating a dressing element across said surface in a plane obliquely disposed to the plane of rotation of said wheel, the angle between the planes of rotation and oscillation being a complement of the angle between the plane of rotation and the axis of the work to be operated on.

2. The method of dressing a concave form on the peripheral surface of a grinding wheel which includes, rotating said wheel, oscillating a dressing element across said surface in a plane obliquely disposed to the plane of rotation of said wheel, the angle between the planes of rotation and oscillation being a complement of the angle between the plane of rotation and the axis of the work to be operated on, and adjusting the radius of oscillation of the dressing element to equal the radius of the finish work piece.

3. The method of dressing a concave form on the peripheral surface of a grinding wheel which includes, rotating said wheel, mounting an oscillatable dressing element with its center of oscillation coinciding with the position of the axis of the work piece when the grinding operation thereon is completed, and oscillating said element in a plane obliquely disposed to the plane of rotation of said wheel at an angle thereto which is a complement of the angle presented between the wheel and the work piece during the grinding operation.

4. The method of dressing a grinding wheel which includes, rotating said wheel, and oscillating a dressing element across the peripheral edge of the wheel in a plane obliquely disposed to the plane of rotation of said wheel, the angle between the plane of rotation and oscillation being a complement of the angle between the plane of rotation and the axis of the work to be operated on, and dressing the side peripheral edges of the wheel to provide conical surfaces thereon.

5. The method of dressing a grinding wheel which includes, rotating said wheel, mounting an oscillatable dressing element with its center of oscillation coinciding with the position of the axis of the work when the grinding operation thereof is completed, oscillating said element in a plane obliquely disposed to the plane of rotation of said wheel at an angle thereto which is a complement of the angle presented between the wheel and the work piece during the grinding operation, and dressing conical forms on the side peripheral edges of said wheel which intersect the surface dressed during the oscillating operation.

CARL J. HALBORG.
WILLIAM A. HART.
PAUL F. SEIBOLD.